3,463,215
METHOD AND APPARATUS OF CONCENTRATING SOLUTIONS
Henry Latta Pinkerton, Hatboro, and Arthur Kenneth Graham, Jenkintown, Pa., and Alphonsus Edward Ward, Lowell, Mich., assignors, by mesne assignments, to Arthur Kenneth Graham, Jenkintown, Pa.
Filed June 12, 1967, Ser. No. 645,177
Int. Cl. B01d 1/22
U.S. Cl. 159—10
10 Claims

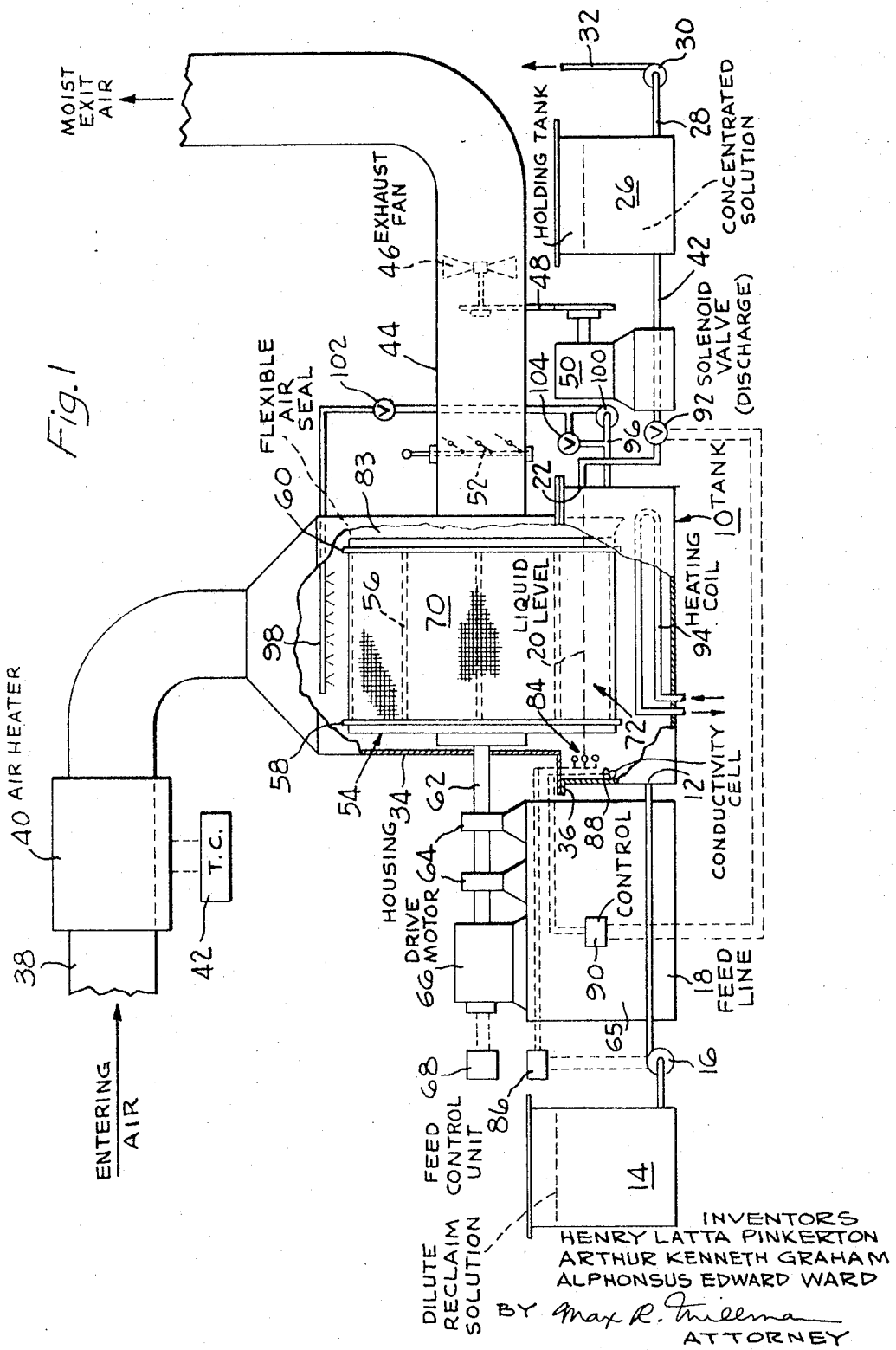

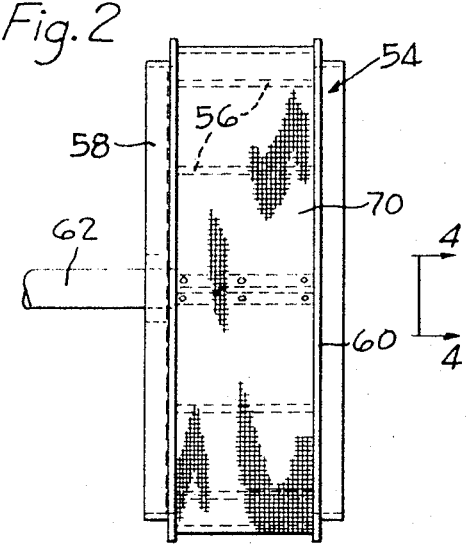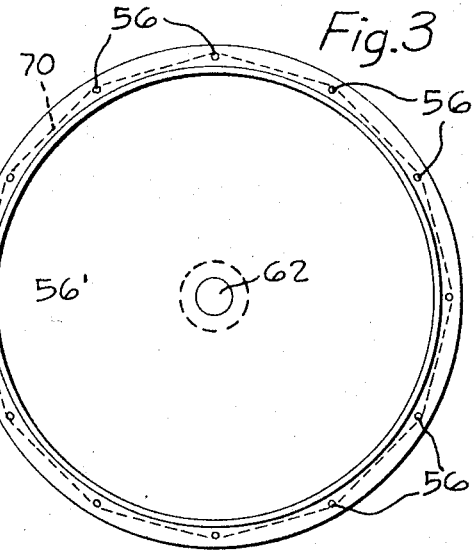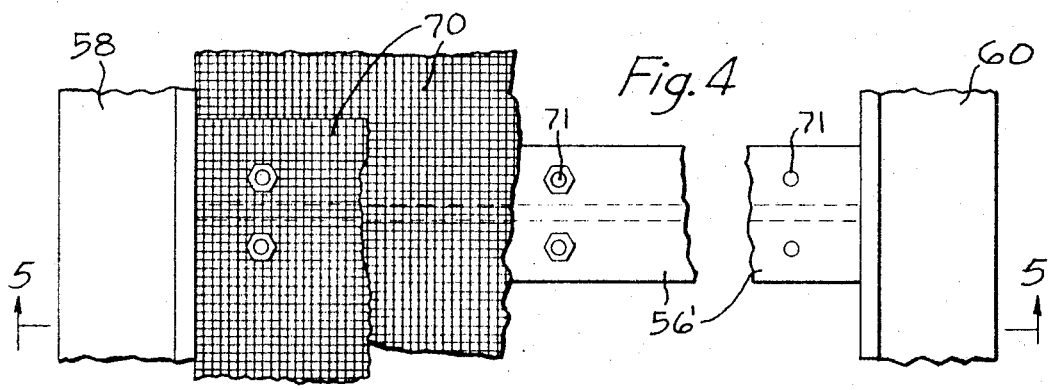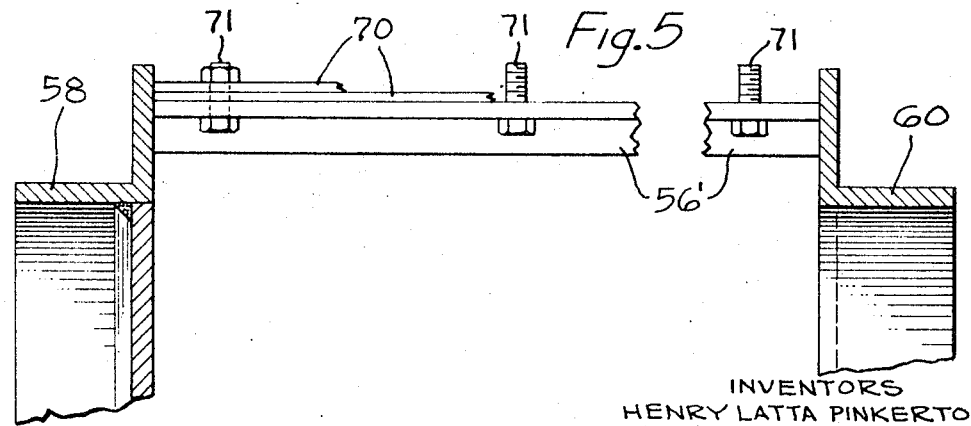

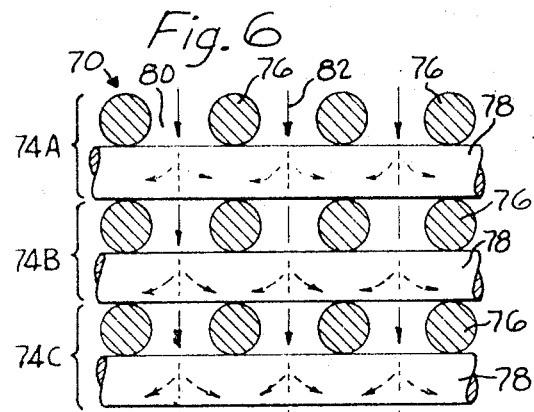
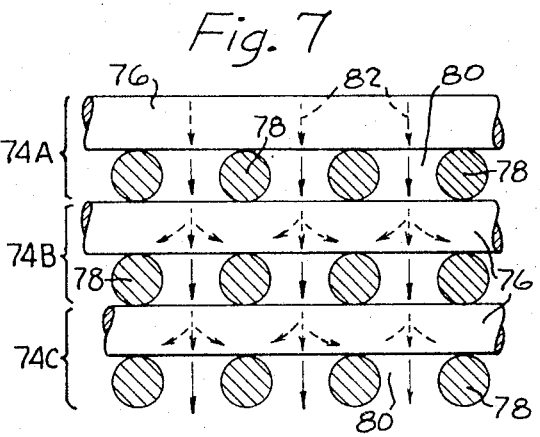
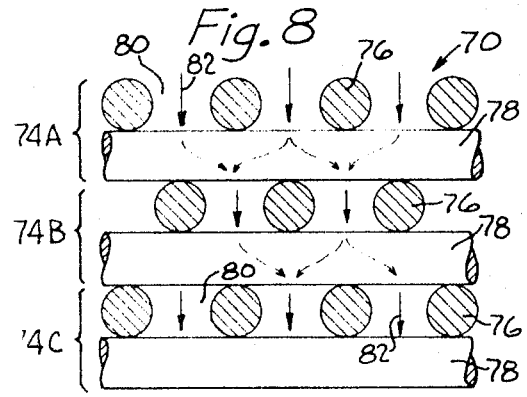
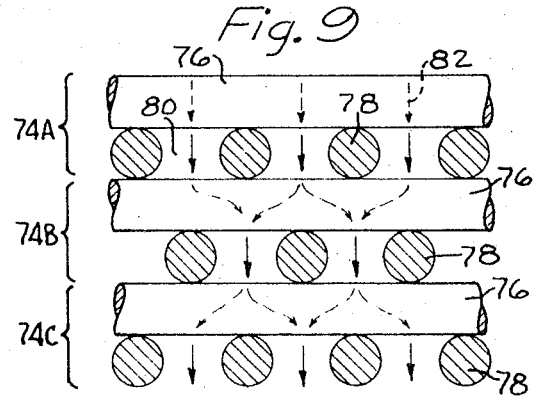
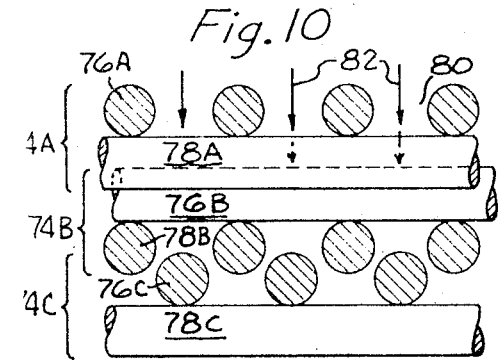
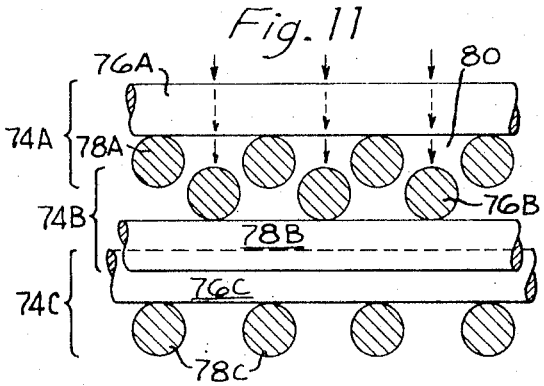
INVENTORS
HENRY LATTA PINKERTON
ARTHUR KENNETH GRAHAM
ALPHONSUS EDWARD WARD
BY Max R. Millman
ATTORNEY United States Patent Office 3,463,215
Patented Aug. 26, 1969

ABSTRACT OF THE DISCLOSURE

An apparatus and method of concentrating solutions in which an air pervious member is rotatably mounted to dip below the level of the solution to be concentrated and forcing a current of heated air through the member above the liquid level to evaporate the solvent from the solution wetting the member, the member comprising an assembly of multiple screen members superimposed on each other in a manner to provide non-blinding passages for the air, and the rate of rotation of the member, air velocity and number of screen members being correlated to yield a high rate of evaporation and overall heat efficiency with virtually no physical carry over of particulate droplets of solution.

---

This invention relates to a method and apparatus of concentrating dilute solutions to a more desirable higher concentration, especially solutions of a sensitive, dangerous or corrosive nature.

Heretofore, two general types of apparatus were employed to effect such concentration. One involved conventional evaporators in single or multiple effects, operated at normal or reduced pressures. The other involved the use of a vertical column or tower packed with solid objects, such as berl saddles or other irregularly shaped objects, operated by trickling the preheated dilute solution down through the column while a stream of air is passed up through the column.

There are several disadvantages to the aforementioned equipment. One is the cost of the equipment, maintenance and operation, especially when the solutions treated are corrosive, such as chromium plating solutions. Another is that in the vertical column or tower operation a relatively large tower must be used to obtain a large area of the packing material. A blower is required to deliver air vertically upward through the tower, but the velocity of the air must be limited to prevent it from blowing the solution out through the air exit. This relatively low air velocity plus the height of the tower which creates a long resistance path and therefore a long contact time during which the air becomes increasingly saturated with the evaporating vapor as it rises, combine to decrease the evaporation rate. The tower method also inherently possesses the disadvantage that the falling liquid, being cooled during evaporation, is at its coolest temperature at the lowest end of the tower where it contacts the driest incoming air, whereas it should be at its hottest temperature. Also normally the liquid is heated to a relatively high temperature, about 175° F. in the case of chromium plating solutions, as it is fed in the top of the tower in order to obtain any reasonbly efficient evaporation. For this purpose costly heat exchangers are used and even if they are made of stainless steel, pyrex or tantalum, at these elevated temperatures they are corrosively attacked by conventional proprietary chromium plating solutions.

Conventional single and multiple effect evaporators, although highly efficient in terms of steam consumption, are subject to other limitations when concentrating plating solutions, many of which are extremely poisonous and/or corrosive, or contain substances prone to undesirable decomposition or excessive volatility at elevated temperatures. Furthermore, this type of evaporator is very expensive and is sophisticated beyond the operating capabilities of ordinary plating personnel.

The primary object of the invention is to provide a method and apparatus of concentrating liquids which overcomes the disadvantages which reside in conventional tower and single and multiple effect evaporators as noted above.

An important object of the invention is to provide a method and apparatus of concentrating solutions, more particularly drag-out reclaim plating or processing solutions, employing a rotatable drum carrying an assembly of screen members which dip below the surface of the liquid to be concentrated and subjecting the thus wetted surface of the assembly of screen members above the liquid level to a current of air which is blown or sucked through the assembly of screen members, with heat applied to the air and/or the solution, whereby the rate of rotation of the drum, the rate of air flow and the number of screen members employed in the assembly are so correlated as to provide a means to concentrate the solution which yields a high rate of evaporation, a high overall rate of heat efficiency and virtually no physical carry over of particulate droplets of solution.

A feature of the invention is the use in the method and apparatus as described hereabove of a rotatable drum carrying a screen assembly comprising a plurality of superimposed screen members so oriented as to provide a tortuous path for the passage of air therethrough without in any way restricting the open cross-sectional area of each screen member, thereby increasing the evaporative efficiency.

Another object of the invention is to effect the efficient recovery of valuable solutions at full or near full strength, especially those solutions used in electroplating and related operations which have been carried out of the processing tank by the workpieces and their holders or carriers and which have been rinsed therefrom. The instant invention enhances the value of systems for recovering drag-out reclaim solutions in general and more particularly the barrel drag-out recovery system described in copending applications Ser. No. 544,306, filed Apr. 21, 1966 and Ser. No. 609,620, filed Jan. 16, 1967.

A further object of the invention is to provide a method and apparatus for efficiently reducing the quantity of chemicals in the solutions normally going to waste, thereby effecting savings in the amount and cost of chemicals required to treat the waste.

These and other objects of the invention will become more apparent as the following description proceeds in conjunction with the accompanying drawings, wherein:

FIG. 1 is a schematic side elevational view of the instant apparatus, partially broken away to disclose internal details;

FIG. 2 is a schematic side elevational view of the screen assembly comprising the perforate member carried on a roatatable drum;

FIG. 3 is a schematic end elecational view thereof;

FIG. 4 is a fragmentary view taken on the line 4—4 of FIG. 3 and illustrating a means of fastening the screen assembly to the drum;

FIG. 5 is a sectional view taken on the line 5—5 of FIG. 4;

FIG. 6 is an enlarged sectional view diagrammatically illustrating air flow through a screen assembly comprising three screen members, the strands of whose alternate sub-layers are vertically aligned;

FIG. 7 is a view similar to FIG. 6 but taken at right angles thereto;

FIG. 8 is a view similar to FIG. 6 of another arrangement of a screen assembly comprising three screen members which produce a non-blinding tortuous path of air flow but the strands of whose alternate sub-layers are vertically disaligned;

FIG. 9 is a view similar to FIG. 8 but taken at right angles thereto;

FIG. 10 is a sectional view similar to FIG. 6 but showing a screen assembly comprising three screen members so arranged as to provide blinded or inoperative openings; and FIG. 11 is a view similar to FIG. 10 but taken at right angles thereto.

Specific reference is now made to the drawings in which similar reference characters are used for corresponding elements throughout.

The overall concentration method and apparatus is shown in FIG. 1. A suitable tank 10 is provided containing liquid to be concentrated. The liquid is fed into the bottom of the tank at 12 from a holding tank or reservoir 14, such as a drag-out reclaim tank, via a feed pump 16 which is operatively connected in the feed line 18. Although this pumping arrangement is peferred, it will be understood that it is merely illustrative as controlled gravity feed may also be employed.

A desired liquid level 20 in the tank 10 is maintained by providing an overflow weir or outlet 22 at a desired height above the bottom of the tank which communicates with a discharge pipe 24, the latter being operatively connected to the bottom of a concentrated liquid holding tank 26 from which the concentrated liquid may in turn be fed to a processing tank (not shown) via discharge pipe 28, pump 30, and discharge pipe 32 operatively interconnected for this purpose.

A housing 34 is appropriately secured to the top flange 36 of the tank 10 and at its upper end is connected to an air inlet duct 38 which passes through an air heater 40 equipped with an air temperature control unit 42.

Appropriately secured to one side of housing 34 above the flange 36 of the tank is a moist air discharge or vent duct 44 in which is suitably mounted exhaust fan 46, the latter being connected by a suitable means such as pulley and belt drive 48 to a drive motor 50. To vary the speed of the fan the belt drive 48 may be altered or the drive motor may be a variable speed unit. In advance of the fan, the vent duct 44 carries a suitable damper 52 to vary air flow discharge.

An air pervious unit 54 is provided having a framework comprised of circumferentially spaced axially extending bars or rods 56 which are terminally secured to end circular frame members 58 and 60, thus forming a cylindrical drum. The end member 60 is an open framework consisting of a ring appropriately braced by a spider so that air can pass therethrough to the vent duct, whereas end member 58 is solid to close off the drum and thus cause the air stream to pass into the vent duct. The end member 58 is centrally secured to a drive shaft 62 which passes through the wall of the housing 34 opposite the vent duct 44 and is journaled for rotation in suitable bearings 64 mounted on a support 65. The shaft 62 is operatively connected to a drive motor 66 which is also preferably mounted on the support 65 and which is equipped with or connected to a variable speed control unit 68. A screen assembly 70 is mounted around the axial rods or bars 56 and between the end frame members 58 and 60 in any suitable manner as, for example, by threaded lugs 71 (FIGS. 4 and 5) extending outwardly from one or more of the rods or bars 56 and through the screen assembly, a washer and nut being used to securely hold them in position. The arrangement is such that the rotatable air pervious member 54 is enclosed in the housing 34 and a lower portion 72 thereof dips into or is submerged below the liquid level 20 in the tank 10.

The screen assembly 70 is comprised of multiple screen members 74, up to fifteen or more, each of which consists of two conjoined sub-layers 76 and 78 (see FIGS. 6–9) of spaced parallel strands which cross each other to form a series of through holes 80. As distinguished from a conventional woven or electroformed metal screen member in which al of the strands comprising the screen member lie substantially in a common plane, the screen members in the instant invention each consist of sub-layers of parallel strands which are in discrete planes one with respect to the other. The strands of the contacting sub-layers of adjacent screen members must traverse each other in the sense that their common axes are at discrete angles to each other greater than zero and less than 180°, i.e., other than parallelism. The significant aspect of this arrangement is that a multiplicity of screen members 74A, 74B and 74C are employed which are superimposed on each other in this manner so that no blocking or blinding of the through holes 80 occurs, i.e., the open cross-sectional area of each screen member is not reduced when it is superimposed on the next member.

In the arrangement shown in FIGS. 6 and 7 it will be seen that this orientation of screen members 74 takes the form of super-imposing one on the other in such a manner that the strands of alternate sub-layers, i.e., 76 vis a vis 76 and 78 vis a vis 78, and vertically aligned and the path of the air through all the multiple screen members is shown by the arrows 82.

In the arrangement shown in FIGS. 8 and 9, it will be seen that this orientation of screen members takes the form wherein the strands of alternate sub-layers of the screen members are disaligned vertically, i.e., strands 76 and 78 of screen member 74A are vertically disaligned relative to strands 76 and 78 of the next screen member 74B, etc. but without blinding or blocking so that the open cross-sectional area of each screen member 74A, 74B and 74C is not reduced. In this arrangement the flow of air 82 through all the multiple screen members is more tortuous than in the arrangement shown in FIGS. 6 and 7.

Where, as shown in FIGS. 10 and 11, the common axes of the contacting sub-layers (i.e., 78A and 76B, 78B and 76C, etc.) are at substantial parallelism so that the contacting sub-layers interdigitate, the open cross-sectional area of each screen member is totally or partially restricted, depending upon the relative dimensions of the openings 80 versus the strands. In this case the air flow shown by the arrows 82 is substantially blocked before it even gets beyond the first screen member 74A and the subsequent screen members 74B and 74C continue further to restrict this flow.

A preferred form of screen is Du Pont's Vexar polyethylene screen 40-ADS-129, which has about 3.0 sq. ft. of surface area per sq. ft. of projected area, has twelve 0.040 in. strands per linear in. arranged in two conjoint sub-layers of strands arranged as shown in FIGS. 6 and 7. Polyethylene is resistant to the corrosive action of all aqueous plating solutions up to about 150° F., at which point it becomes mechanically unsound although it is still corrosion-resistant. It will be understood that other corrosin-resistant materials may also be used with suitable limiting temperature characteristics and provided that the design of the screen member made therefrom can be adapted to the principles of this invention. The multi-member non-binding screen assembly described above can be obtained by wrapping a continuous long length of Vexar screen around the rods or bars 56 of the drum 54 for a multiplicity of turns and then secured in place as described hereinbefore. It is also possible to loop the end of one screen member around one support rod or bar 56, having no stud bolts 71, to then heat weld the loop of screen material so formed and continue to wrap the same from a roll as a continuous screen member around the drum to build up a screen assembly of fifteen or more members as may be desired and finally to secure the loose end of the screen material by heat welding.

By contrast even two layers of a conventionally woven screen can cause up to 50% blinding and more layers further restrict the open cross-sectional area of each screen member and even to an intolerable degree, no matter how wrapped. It will be understood that multiple superimposed screen members having the non-blinding arrangement can also be formed in other ways, as by placing separate individual screen members around the rods or bars 56 in the proper manner as illustrated in FIGS. 6 to 9 but not as illustrated in FIGS. 10 and 11.

In use the incoming air may be heated by a conventional form of air heater 40, such as a gas-fired unit, to a controllably high temperature, preferably about 300° F. or more. The heated air is sucked into the housing 34 at a controllable rate by the fan 46 and the use of the damper 52. The heated air may alternatively be blown into the housing, but the use of an air exhaust fan is preferred. The heated air then passes through the multiple member assembly of non-blinding screen members 74A, 74B and 74C, etc., carried by the frame of the drum 54 inwardly thereof while the drum 54 is rotated by the motor 66 at a rate controlled by the unit 68. Once the drum 54 is partly immersed in the solution to be concentrated, the screen assembly is wetted with the solution as the drum 54 rotates and the air passes unrestrictedly through the openings 80 in the screen above the liquid level 20 from the entering outside surface into the existing inside surface of the screen assembly 70, shown in FIG. 3, causing the water or solvent to vaporize. The air now laden with moisture or vaporized solvent passes out the discharge or exhaust vent 44 while the concentrated solution formed on the screen assembly is carried back to the tank 10. To prevent air leakage around the open or discharge end of the drum 54, a flexible gasket 83 is fastened to the housing 34 which bears against the end member 60 of the drum during rotation.

The controllable feed of dilute reclaim solution from reservoir 14 to tank 10 may be an electrically activated triple probe level control 84 operatively connected to the drive motor of pump 16 via a control unit 86. Should the solution level in the concentrator tank 10 reach the top probe, which is located above the predetermined liquid level 20, pump 16 is shut off and then when the liquid level in the concentrator tank 10 falls to the middle probe, the pump 16 re-starts and remains on until or unless the liquid level in the concentrator tank 10 again reaches the top probe.

The control of the concentration of the solution leaving tank 10 through outlet 22 may be accomplished by inserting a conductivity cell 88 in the solution in tank 10 which is set to a predetermined valve of concentration. The cell is operatively connected via electrical control means 90 to solenoid valve 92 in discharge line 24 so that when the concentration of the solution in tank 10 reaches or exceeds the pre-set value, the solenoid valve 92 will be opened and when the concentration falls below the pre-set valve, the solenoid valve will close.

While we prefer to heat the air, it will be understood that the required heat may be applied in part or in whole to the solution to be concentrated as, for example, by a heating coil 94 immersed in the solution in tank 10, the coil being equipped with a suitable temperature control. Also while the fan may be located before or following the air heater or the rotating drum 54, we prefer to place it between the drum 54 and the air discharge vent to duct 44 so as to cause the air to flow from the exterior to the interior of the drum 54. The liquid level 20 may be maintained by pumping dilute solution from a holding tank 14 at a rate which will compensate for the rate of evaporation of the water or solvent and maintain the desired rate of overflow through outlet 22. The source of dilute solution in the holding tank 14 may be the drag-out reclaim station of rack plating processes or the drag-out reclaim station of barrel processes as shown and described in the aforementioned copending applications Ser. No. 544,306 and Ser. No. 609,620. The overflow of concentrated solution from the concentrator tank 10 may be controllably fed directly or via a holding tank 26 to a rack plating or processing tank or one used for barrel plating or processing as shown and described in the aforesaid applications. Also, for maximum utilization of available evaporative surface, a minimum percentage of the total screen area should be immersed below the liquid level.

It has been found that there is an inter-relationship between the total heat input by means of heated air and/or solution, the air velocity through the screen assembly along the direction of flow through it, the rate of rotation of the screen assembly, the surface area of the screen assembly, and the number of screen members comprising the same, whereby high rate of evaporation as well as high overall heat efficiency can be obtained with virtually no physical carry-over of particulate droplets of solution by the air stream hereinafter called "misting," so that the air stream carries with it only water vapor as such. Misting is an undesirable condition for several reasons. First, it is uneconomical because it means a loss of valuable solution up the exhaust vent to the atmosphere. Second, the entire exhaust duct must be corrosion resistant if misting occurs and protective painting would be required. However, corrosive chemicals such as chromium plating solutions would require more costly corrosion resistant materials. Also when the misting occurs the exhaust will constitute a serious atmospheric polution condition with dangerous chemicals such as cyanides or chromates, and its abatement would necessitate installing an expensive fume-washer in the exhaust duct, the washings from which would have to be safely disposed of, preferably by reconcentrating for re-use, which is not economical.

The theoretical rate of evaporation should be a direct function of the total exposed surface area of the solution being evaporated, or in the case of a screen assembly of multiple screen members on a given size concentrator drum, a direct function of the number of screen members in the screen assembly. In practice, however, it has been found that the rate of evaporation $\Sigma$ is very nearly a direct function of the square root of the number of screen members N used in the screen assembly, i.e., $\Sigma \propto \sqrt{N}$ (approx.), at least up to 15 screen members.

Furthermore the inter-relationship between the temperature of the air, the rate of rotation of the screen assembly, the velocity of the air entering the screen assembly and the number of screen members comprising the screen assembly is such that no misting will occur when, in the operation, the outside surface, i.e., the outer screen member, where the air enters is only slightly wet, damp or approaches dryness and the inside surface, i.e., the inner screen member, where the air exits is wet, but not soaked, as shown in Table I.

TABLE I.—CONCENTRATOR TEST DATA RE-MISTING

| Run No. | No. of screen members | Screen speed, f.p.m. | Air velocity, f.p.m. | Static suction, inches H₂O | Conditions of screen assembly as judged by touch and appearance | | Appearance of misting |
|---|---|---|---|---|---|---|---|
| | | | | | Inside exit air side | Outside, entering air side | |
| 15 | 1 | 125 | 295 | | Wet | Damp | None. |
| 14 | 1 | 125 | 483 | | Wet | Wet | V. slight. |
| 4 | 3 | 78 | 500 | | Wet | Damp | None. |
| 10 | 6 | 125 | 308 | | Wet | do | Do. |
| A | 12 | 78 | 553 | 3.75 | Soaked | Soaked | V. heavy. |
| B | 12 | 78 | 519 | | do | do | Heavy. |
| 2B | 12 | 35 | 519 | 3.31 | Wet | Wet | Slight. |
| E | 12 | 7.8 | 519 | | Wet | Dry | None. |
| F | 12 | 12.5 | 519 | | Wet | Damp | Do. |
| 3B | 12 | 12.5 | 536 | 2.25 | Wet | Sl. wet | Do. |
| 8B | 15 | 12.5 | 465 | 1.95 | Wet | do | Do. |

The static suction figure is principally a measure of the pressure drop through the screen. It will be noted that there is little change in this parameter as long as the screen is thoroughly wet (Runs A and 2B), whereas under the no-misting conditions of Runs 3B there is an appreciable fall-off in this suction, and this is true even though the air velocity is actually higher than in Run 2B.

Similar sets of conditions have been found for certain other combinations of screen speed and air velocity, using other air inlet temperatures and varying numbers of screen members. Table II shows several typical runs, employing various numbers of the Vexar screen members in the screen assembly which was wrapped around a roughly cylindrical drum about 4 feet in diameter. The width of the screen was 18 inches, and the gross projected area of one layer of screen beyond the solution was about 15.7 sq. ft.

TABLE II.—CONCENTRATOR TEST DATA

| Run No | 14 | 8 | 10 | 4B | 8B |
|---|---|---|---|---|---|
| No. screen members, N | 1 | 3 | 6 | 12 | 15 |
| Square root of N, $\sqrt{N}$ | 1 | 1.73 | 2.45 | 3.47 | 3.88 |
| Drum speed, r.p.m | 10 | 10 | 10 | 1 | 1 |
| Air velocity,[1] f.p.m | 483 | 496 | 308 | 535 | 465 |
| Approach air T., °F | 137 | 142 | 273 | 120 | 182 |
| Heat input, B.t.u./hr | 292 | 285 | 300 | 269 | 302 |
| Evaporation, gal./hr | 8.57 | 15.2 | 16.35 | 22.0 | 27.5 |
| Evap. rate, gal./hr./SF screen [2] | 0.55 | 0.97 | 1.04 | 1.40 | 1.75 |
| Ratio evap. rate, (X÷0.55) | 1.0 | 1.76 | 1.89 | 2.54 | 3.18 |
| M.b.t.u./gal. evap | 34.0 | 18.8 | 18.4 | 12.2 | 10.9 |
| Overall heat eff., percent | 26.2 | 44.5 | 45.5 | 68.3 | 76.0 |
| Evaporative eff., percent | 51.5 | 72.9 | 88.5 | 94.5 | 95.0 |
| Misting | Trace | None | None | None | None |

[1] Across the air duct approaching the screen assembly.
[2] Projected area above solution of one screen member.

As a further check on freedom from misting, a number of runs were made in which the solution contained 5 g./l. of nickel as nickel sulfate, and the solution was analyzed for nickel before and after each run. In runs where no visible misting occurred, there was no visible accumulation of nickel salts in the air duct, and the two analyses agreed, and it was thus confirmed that in fact no misting has occurred.

During these runs it was also noted that even with equilibrium air temperatures of over 270° F., the process of rapid evaporation so quickly removed a very considerable quantity of heat from the air that both the screen and the solution wetting it were cool to the touch. Hence, sensitive solution components will neither be altered nor destroyed, nor lost by volatilization. Thus, in some runs, it was found that the solution in the concentrating tank 10 was lowered a few degrees while in others there was a similarly slight rise in temperature. Therefore, for solutions containing extremely heat-sensitive components, some low-capacity cooling means can readily be provided to prevent the occurrence of excessive solution temperatures. For solutions that are not heat-sensitive, on the other hand, it is entirely within the scope of this invention to apply some or even all of the desired heat input directly to the solution itself, as by example to maintain said solution at 150° F. during operation. Although the stated maximum operating temperature is 150° F. for the Vexar screen material, no difficulty from this source was experienced in several runs using air heated well above this temperature, owing to the brief contact time of the screen under the heated solution and to the immediate cooling effect upon emergence therefrom, owing to the high evaporation rate, as hereinbefore described.

Thus, it has been found unexpectedly that a high rate of air flow does not per se cause misting. Rather, a quite high rate of air flow can be used without misting if a sufficient number of screen members comprising the screen assembly are used, or the heat input is increased, or the rotational speed of the drum is decreased, or several of these parameters are simultaneously varied in the indicated direction. Furthermore, the apparatus and method of the instant invention are such that the screen assembly is free from blinding even when dry since dry crystallized salts which might cause blinding are redissolved in the solution being concentrated as the screen assembly revolves. Also the evaporative cooling effect is such that it is possible to operate wtih air and/or solution temperatures far in excess of the upper temperature limits of the screen material without the actual screen temperature approaching these limits.

If the rotational speed of the drum is so low that a portion of the surface of the screen assembly approaching the solution may become wholly dry before re-immersion, this will reduce the efficiency of evaporation. Also, especially when operating with high entering air temperature, the screen assembly may overheat, with resultant damage to the plastic material of which it is made. Under such conditions it may be desirable to pump a portion of the solution being concentrated and spray it above the rotating screen member. To accomplish this, a conduit 96 is operatively connected between the tank 10 and spray heads 98 which are suitably mounted in the hood 34 above the drum 54. Interposed in the conduit 96 is a pump 100 and a valve 102 and a by-pass valve 104 is installed between the discharge and intake sides of the pump 100 by means of which valves the volume of solution supplied to the sprays from the tank 10 may be controlled as desired.

Therefore, to attain a high evaporative efficiency and high overall heat efficiency without misting, as shown in Table II, the heat input, the entering air temperature and velocity for a given screen assembly, the drum diameter and the rate of rotation thereof are inter-related to attain the required degree of wetting of the outer surface relative to the inner surface of the screen assembly.

As noted hereinbefore, the present invention is particularly useful in the plating and metal finishing industries which encounter considerable loss of valuable chemicals to waste. Economical recovery of these chemicals, generally lost in the rinse water, can be effected with a drag-out recovery tank. The successful operation of such a tank requires that the drag-out solution be withdrawn while its concentration is relatively low and that the total volume thereof be returned to the processing tank.

Accordingly, the rate at which the volume in the processing tank decreases due to surface evaporation must equal or exceed that at which the drag-out solution is withdrawn from the drag-out tank. Most processing baths operate between room temperature and about 135° F. in which case the rate of bath evaporation is much less than the usual rate of withdrawal of drag-out solutions. Thus, conventration of the drag-out solution is required before it can all be returned to the processing tank. The instant invention is especially well adapted for this because of its efficiency at relatively low solution temperatures and relatively low equipment cost.

While preferred embodiments of the invention have been shown and described herein, a skilled artisan may make minor variations without departing from the spirit of the invention and the scope of the appended claims.

We claim:

1. A concentrator comprising a tank containing a solution, means to maintain the solution in said tank at a predetermined liquid level, a hollow drum having a perforate circumferential wall, means mounting said drum so that a portion of said perforate wall dips below said liquid level, means to rotate said drum, a discharge vent, and means causing a forced stream of air to pass through said perforate wall into said drum and out through said discharge vent to evaporate the solvent from the solution wetting said perforate wall as the concentrate is returned to said tank, said perforate wall comprising a plurality of concentric, contiguous screen members each screen member including two conjoined transverse sub-layers of spaced parallel non-woven strands which are in discreet concentric surfaces one with respect to the other and the axes of the strands of one of the contacting sub-layers are at a discreet angle with respect to the axes of the contacting sub-layer of the other screen member, greater than zero and less than 180°, such that the strands of one contacting sub-layer do not interdigitate with the strands of the other contacting sub-layer.

2. The concentrator of claim 1 and means to heat the air before it passes through said screen members and/or the solution in the tank.

3. The concentrator of claim 1 and a housing on said tank enclosing said drum, an air inlet duct opening through said housing opposite said circumferential wall of said drum formed of said screen members, said discharge vent opening through said housing and an exhaust fan in said vent acting to pull air through said screen members.

4. The concentrator of claim 1 wherein said drum includes end walls joined by spaced axial bars over which said screen members are mounted, one end wall being imperforate and operatively connected to said drum rotating means, said other end wall being open and disposed adjacent said discharge vent so that the air stream will be directed through said screen members and into said vent.

5. The concentrator of claim 1, a housing on said tank enclosing said drum, spray means in said housing above and opposite said screen members, and means to controllably deliver solution from said tank to said spray means to keep said screen members moist until re-immersion into said liquid and to prevent overheating of said screen members when required.

6. The concentrator of claim 1 wherein said screen members are each made of polyethylene and has about 3.0 sq. ft. of surface area per sq. ft. of projected area and at least twelve 0.040 in. strands per linear in.

7. A method of concentrating a solution comprised of controllably maintaining the solution at a predetermined liquid level, partially immersing in the solution and rotating a perforate hollow unit therein, said unit including screen members, each screen member including two conjoined transverse sub-layers of spaced parallel non-woven strands which are in discreet concentric surfaces one with respect to the other and the axes of the strands of one of the contacting sub-layers are at a discreet angle with respect to the axes of the contacting sub-layer of the other screen member, greater than zero and less than 180°, such that the strands of one contacting sub-layer do not interdigitate with the strands of the other contacting sub-layer, forcing a stream of air through said screen members above the solution to evaporate the solvent from the solution wetting said screen members while the concentrate is returned to the tank, heating the incoming air and/or the solution and maintaining the total heat input, the air velocity along the direction of flow through the screen members and the rate of rotation of the screen members such that the outer screen member where the air enters is no greater than slightly wet whereas the inner screen member where the air exists is wet but not soaked to prevent particulate droplets of solution from being carried into the discharge vent by the air stream and obtain a high rate of evaporation as well as a high overall heat efficiency.

8. The method of claim 7 and controllably spraying solution on the screen members outside the solution to keep said members moist until re-immersion in the solution.

9. The concentrator of claim 1 wherein the axes of the strands of the contacting sub-layers of adjacent screen members are at discreet angles of 90° to each other.

10. A concentrator comprising a tank containing a solution, a hollow drum having a perforate circumferential wall rotatably mounted so that a portion of said perforate wall dips below said liquid level, said perforate wall comprising a plurality of concentric, contiguous screen members, each screen member including two conjoined transverse sub-layers of spaced parallel non-woven strands which are in discreet concentric surfaces one with respect to the other and the axes of the strands of one of the contacting sub-layers are at a discreet angle with respect to the axes of the contacting sub-layer of the other screen member, greater than zero and less than 180°, such that the strands of the other contacting sub-layer, and means causing a forced stream of air to pass through said screen members into and out of said drum to evaporate the solvent from the solution.

References Cited

UNITED STATES PATENTS

| | | | |
|---|---|---|---|
| 2,048,244 | 7/1936 | Bray et al. | 210—68 X |
| 2,081,296 | 5/1937 | Gard | 210—68 X |
| 2,259,606 | 10/1941 | Beardslee et al. | 159—11 |
| 2,879,607 | 3/1959 | Fleissner | 34—122 X |
| 3,029,948 | 4/1962 | McKay | 210—68 |
| 3,210,260 | 10/1965 | Denker et al. | 202—236 |

NORMAN YUDKOFF, Primary Examiner

J. SOFER, Assistant Examiner

U.S. Cl. X.R.

159—49